United States Patent [19]
Christopher et al.

[11] Patent Number: 5,363,615
[45] Date of Patent: Nov. 15, 1994

[54] ENERGY-EFFICIENT SUN ROOM

[75] Inventors: Michael E. Christopher, Houston; Gerald N. Cochran, Dickinson, both of Tex.

[73] Assignee: Texas Aluminum Industries, Inc., Houston, Tex.

[21] Appl. No.: 74,221

[22] Filed: Jun. 9, 1993

[51] Int. Cl.⁵ .......................... E04B 1/56; E04C 3/02
[52] U.S. Cl. ...................... 52/272; 52/92.3; 52/93.1; 52/204.593; 52/204.597
[58] Field of Search ............... 52/66, 92.3, 93.1, 398, 52/400, 272

[56] References Cited

U.S. PATENT DOCUMENTS

| | | | |
|---|---|---|---|
| 3,331,173 | 7/1963 | Elsner | 52/309 |
| 4,223,666 | 9/1980 | Wasserman | 126/429 |
| 4,273,099 | 6/1981 | Morgan | 126/426 |
| 4,316,405 | 2/1982 | Esposito . | |
| 4,326,365 | 4/1982 | Svensson | 52/204 |
| 4,327,532 | 5/1982 | Matthews | 52/92.2 |
| 4,438,614 | 3/1984 | Raith et al. | 52/580 |
| 4,462,390 | 7/1984 | Holdridge et al. | 126/430 |
| 4,583,333 | 4/1986 | Minter | 52/90 |
| 4,601,139 | 7/1986 | Esposito | 52/93.1 |
| 4,671,027 | 6/1987 | Esposito | 52/86 |
| 4,678,019 | 7/1987 | Esposito | 160/272 |
| 4,724,646 | 2/1988 | Meyers | 52/93.1 |
| 4,739,593 | 4/1988 | Janke et al. | 52/64 |
| 4,744,403 | 5/1988 | Hausmann et al. | 160/272 |
| 4,765,102 | 8/1988 | Kuchem | 52/28 |
| 4,796,395 | 1/1989 | Israel | 52/86 |
| 4,831,793 | 5/1989 | Galloway et al. | 52/86 |
| 4,853,264 | 8/1989 | Vincent et al. | 428/34 |
| 4,864,783 | 9/1989 | Esposito | 52/86 |
| 4,884,376 | 12/1989 | DeBlock et al. | 52/90 |
| 5,007,215 | 4/1991 | Minter | 52/92.3 |
| 5,038,517 | 8/1991 | Talbott | 47/17 |
| 5,086,599 | 2/1992 | Meyerson | 52/309.9 |

FOREIGN PATENT DOCUMENTS 976927  12/1964  United Kingdom .

OTHER PUBLICATIONS

"METL-SPAN IV Insulated Panels" brochure of METL-SPAN Corporation.
"Elite's Insulated Roof Systems" publication of ELITE Panel Products.
"Panelfab Condensed Loading Tables" publication of Panelfab International Corporation.
Panelfab publication—home improvement products "Family Room, Game Room, . . .".

Primary Examiner—James L. Ridgill, Jr.
Attorney, Agent, or Firm—Pravel, Hewitt, Kimball & Krieger

[57] ABSTRACT

The energy-efficient sun room of this invention includes a generally rectangular or box-like frame assembly including a front wall, opposing side walls with a curved transition section between a flat, major roof portion and the front wall. The flat, major roof portion includes a plurality of roof frame members which mount insulated roof panels to provide insulation against the sun. The curved transition section mounts curved glass panel members to enhance the overall open appearance of the insulated sun room of this invention. The insulated roof panels and the curved sections of the glass panels are mounted in a continuum to provide an attractive, insulated but open appearing sun room.

16 Claims, 3 Drawing Sheets

ENERGY-EFFICIENT SUN ROOM

FIELD OF THE INVENTION

The field of this invention relates to sun rooms which may be added onto existing structures such as houses or other buildings and in particular to energy-efficient sun rooms.

BACKGROUND OF THE INVENTION

Sun rooms or solariums are well-known in the art. Generally, such sun rooms are mounted or attached onto homes or other existing structures in order to provide light and airy additional rooms for family living or for seating for restaurants and the like. Typically, such sun rooms are generally box-like in configuration. One particularly popular variety of sun room, though being generally box-like in shape, includes a curved transition roof portion which gives the sun room a very attractive appearance. Such sun rooms are generally framed in aluminum wherein the frame supports glass sections not only for the sides and front but also for the roof so that the feeling obtained is a light and airy feeling of openness. One of the disadvantages of such sun rooms is energy inefficiency. Because the sun rooms are virtually all glass, there is no insulation and thus heat transfer from a very hot or very cold outside temperature causes the rooms to be either uncomfortable or require extensive cooling or heating. One solution to the heat transfer problem is to make the roof entirely out of insulated materials such as insulated panels. However, such rooms are made with flat roofs which darken the room and remove the curved glass roof to front wall transition section thus eliminating much of the attractiveness of the room. Insofar as known, no one has been able to provide a sun room that includes both insulated panels in the roof and the attractive curved transition from roof to front wall that is so popular today.

SUMMARY OF THE INVENTION

It is an object of this invention to provide a sun room that includes a curved transition from roof to front wall but is substantially more energy efficient than previously known sun rooms that use such curved transition sections. The energy-efficient sun room of this invention includes a generally box-like frame that includes a front wall frame, opposing side wall frames and a roof frame assembly. The front wall frame and the opposing side wall frames mount glass panels, windows and/or doors in predesignated positions in a manner basically known in the art.

The roof frame assembly includes a serious of spaced, roof frame members which support a plurality of insulated roof panels, each of the insulated roof panels being formed of an inner core of insulating material and having outside surfaces formed of thin metal skins. Such roof panels, which are generally rectangular in configuration, have high insulating characteristics.

A curved, transition frame assembly including a plurality of curved transition frame members extending in parallel relationship between the roof frame and the front wall frame include curved, glass panels positioned between the curved transition frame members. The glass panels are inter-connected to the roof and to the front wall in a unique manner such that the curved glass panels and the insulated roof panels form a substantially continuous roof section that inclines downwardly and is smoothly curved into connection with the front wall.

The description just given is intended to be merely a summary of this invention. The exact details of the invention will be set forth hereinafter and the claims will set forth the scope of patent protection sought.

DESCRIPTION OF THE PREFERRED EMBODIMENT

Figure 1:
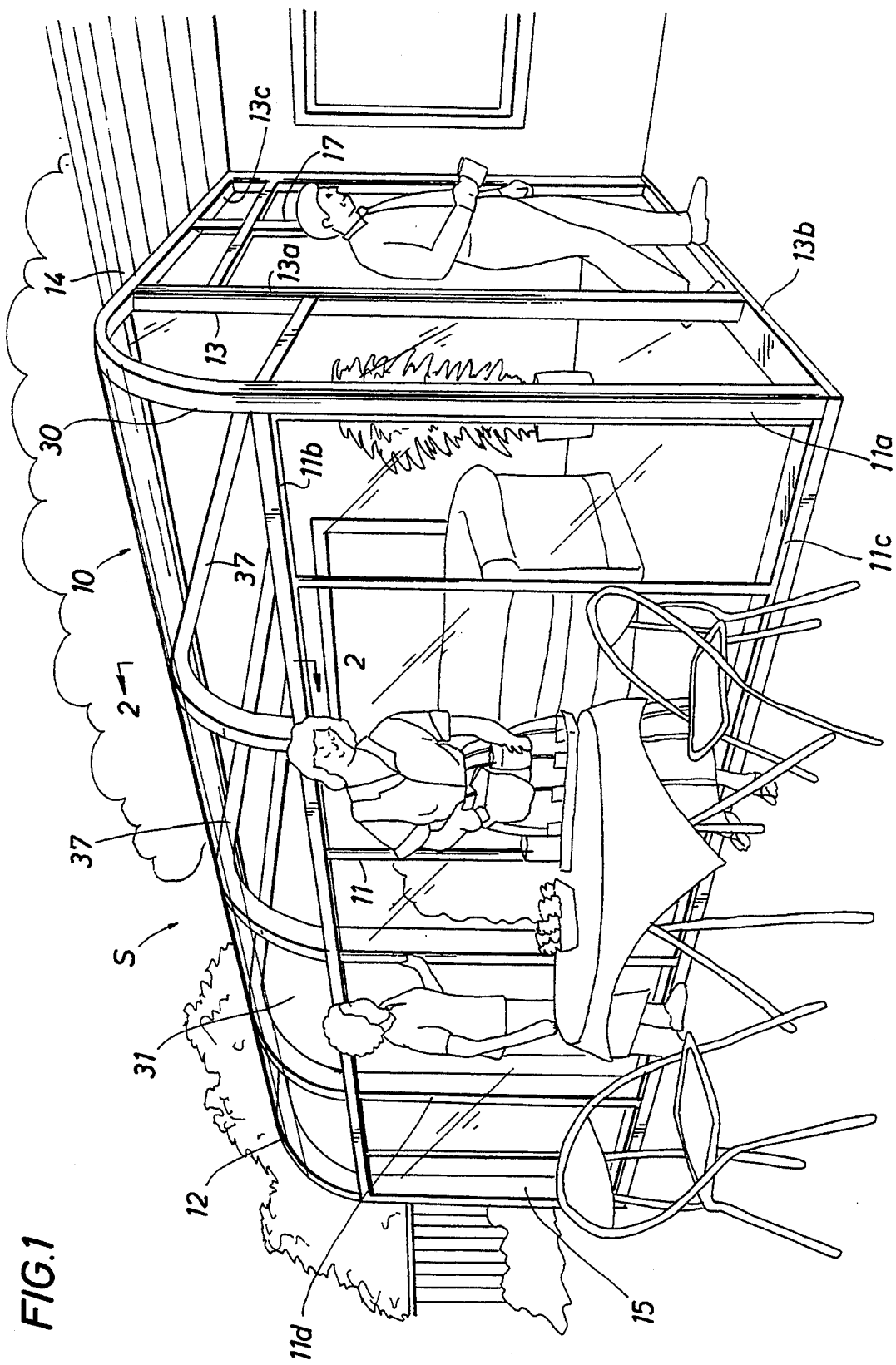
FIG. 1 is a perspective view of an energy-efficient sun room of this invention.

Referring to the drawings and in particular to FIG. 1, the energy-efficient sun room S of the preferred embodiment of this invention is illustrated. The energy-efficient sun room includes a generally box-like frame assembly generally designated as 10. The frame assembly includes a front wall frame assembly 11, opposing side wall frame assemblies 12 and 13 and a roof frame assembly 14. The front wall frame assembly 11 includes a generally rectangular frame network 11a including an upper horizontal frame member 11b, a bottom horizontal frame member 11c and a series of vertical frame members 11d located at spaced intervals. The frame members 11a-d cooperate to support a plurality of glass panels such as 15.

The side wall frame assembly 13 is also generally rectangular in configuration (except as hereinafter described) and includes a series of vertical frame members such as 13a and horizontal frame members such as bottom frame member 13b and top frame member 13c which cooperate to support a combination of glass panes such as 16 and doors such as sliding glass doors generally designated at 17. The opposing side wall frame assembly 12 is basically the mirror image of the side wall frame assembly 13.

As more fully described hereinafter, the roof frame assembly 14 includes a generally flat major portion which supports a plurality of insulated roof panels 20 and a curved transition section generally designated as 30 which supports a plurality of curved window panels 31. Thus, the energy-efficient sun room 10 includes all of the desirable features of an open and airy sun room provided by the utilization of aluminum frame members and glass panels but also has substantially greater cooling and heating efficiencies due to the major roof portion supporting a plurality of insulated roof panels 20.

Figure 2:
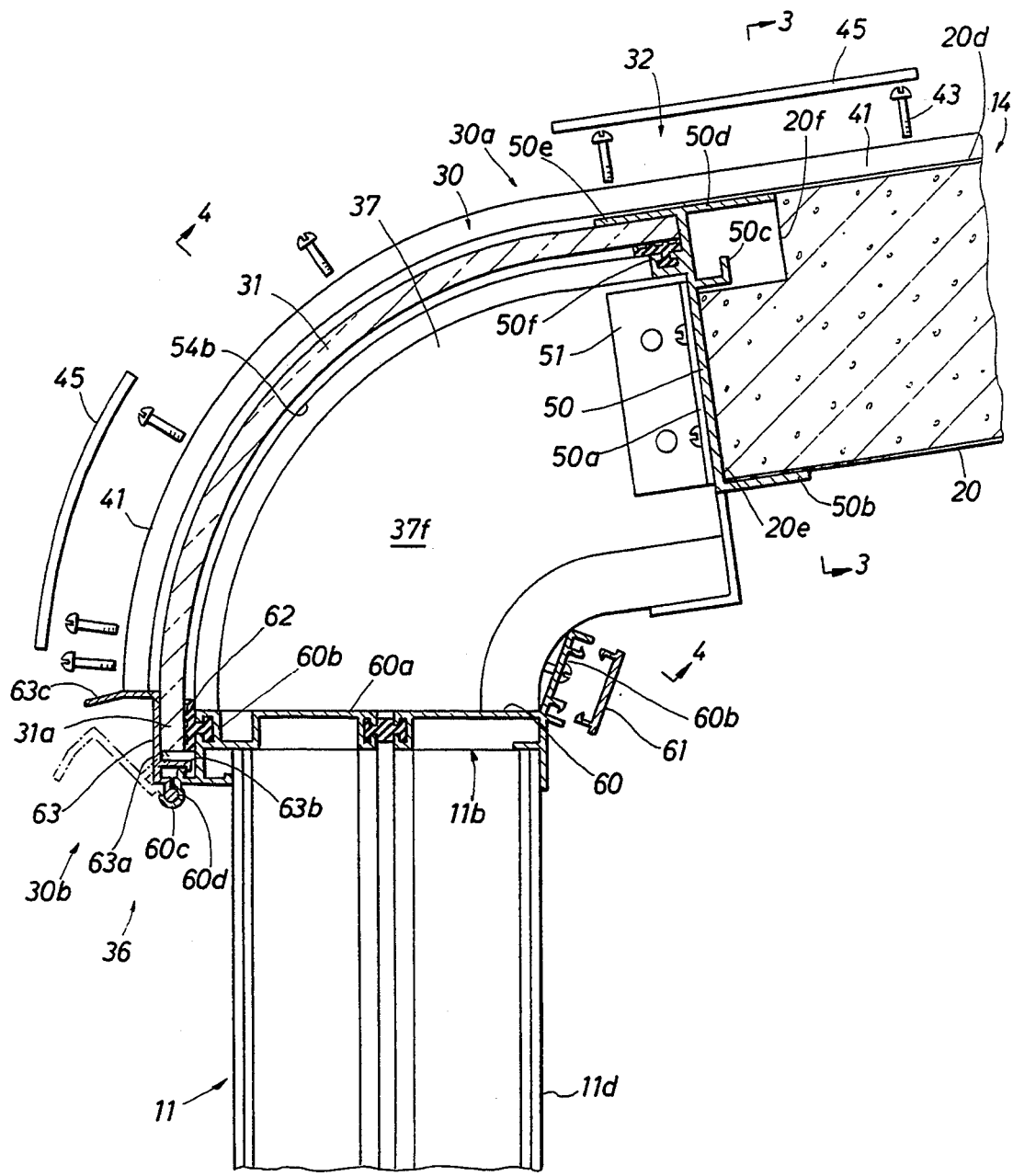
FIG. 2 is a schematic, sectional view of the connection of the curved transition section to both the insulated panels of the roof and to the header of the front wall assembly.

Referring now to FIG. 2, the curved transition frame assembly or section 30 includes a roof adjoining end generally designated as 30a and a front wall adjoining end generally designated as 30b. The roof adjoining end 30a of the curved transition frame assembly 30 is attached to the insulated panels of the major roof section by a roof/curved section transition means generally designated as 32 attaching the roof adjoining end 30a of the curved transition frame assembly to the roof frame assembly generally designated as 14.

The front wall adjoining end 30b of the transition frame assembly 30 is attached to the top horizontal frame member of the front wall frame assembly 11 by a curved section/wall transition means generally designated as 36.

The roof frame assembly 14 includes a plurality of spaced roof frame members 37 which extend in parallel for mounting insulated roof panels 20 which are positioned on each of the roof frame members except the outside members. As illustrated in FIG. 2, the actual angle of the roof portion supported by the spaced roof frame members 37 may be slightly inclined with respect to horizontal for proper drainage.

Figure 3:
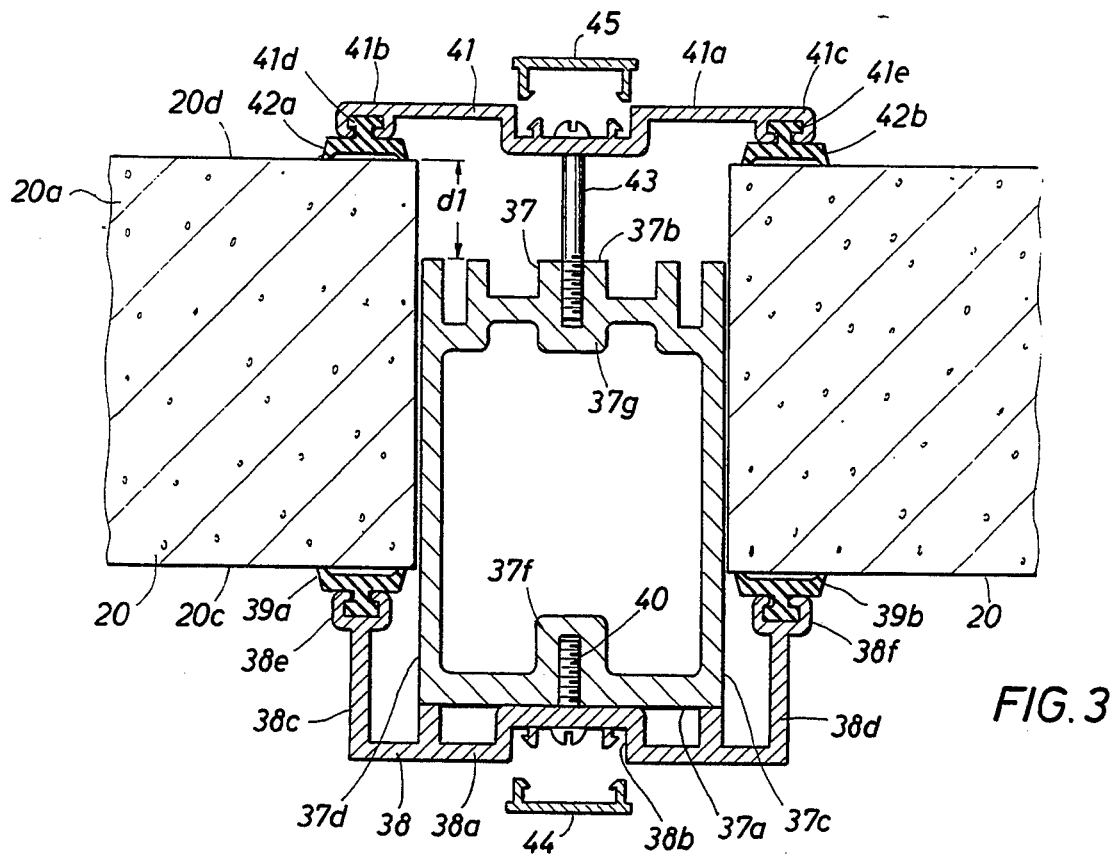
FIG. 3 is a sectional view taken along line 3—3 of FIG. 2 of the connection of the insulated roof panels to parallel roof frame members.

Referring to FIGS. 2 and 3, each of the spaced, roof members 37 is generally rectangular in cross-section and includes a bottom surface 37a, a top surface 37b and side surfaces or walls 37c and 37d. As illustrated in FIG. 3, the internal roof frame members 37 mount insulated panels 20 on each side of the frame members. Each insulated panel 20 includes an insulated core 20a with the bottom and top metallic (typically aluminum or steel) skins 20c and 20d, respectively, laminated to the insulated core 20a. The core 20a is made of a highly heat transfer-resistant material such as expanded polystyrene having high "R" values such as R21. As viewed from the top, the insulated roof panels are generally rectangular in configuration.

In order to mount the insulated roof panels 20 against each wall 37c and 37d of a roof frame member 37, a bottom, generally U-shaped cover 38 is attached to the bottom surface 37a of the roof frame member 37 and extends upwardly in sealing and supporting engagement against each insulated panel 20. The bottom cover includes a generally flat central or main section 38a having a U-shaped central recess 38b and outer, upwardly extending wings 38c and 38d. Each of the wings terminate in generally rectangular sections 38e and 38f each having an internal recess which supports sealing strips 39a and 39b. The central portion 38a of the bottom cover 38 is attached to the bottom surface 37a of the generally rectangular frame member 37 by means of a series of screws 40 which extended into threaded engagement with a central bottom boss portion 37f of the bottom of the roof frame member. A top cover 41, as viewed in cross section of FIG. 3, includes a central substantially flat portion 41a having outside ends 41b and 41c which terminate in downwardly facing rectangular flange portions forming internal generally T-shaped recesses 41d and 41e. The recesses 41d and 41e mount sealing strips 42a and 42b which sealingly engage the top or upper skins 20d of the insulated panels 20. The top cover 41 is attached to the top surface of the frame members 37 by a series of screws 43 which extend into an upper central boss section 37g in the upper surface 37b of the frame members 37. The bottom cover 38 and the top cover 41 cooperate to mount the top surface 20d of the insulated panels 20 a distance d-1 (FIG. 3) from the upper surface 37b of the roof frame member.

The bottom cover 38 and the top cover 41 extend longitudinally along the bottom surface 37a and upper surface 37b, respectively, of the frame members 37 in order to support and seal off the insulated panel members 20. Generally U-shaped cover caps 44 and 45 are attached in the recessed areas such as 38b where the screws 40 and 43 are inserted in order to cover the otherwise exposed screws and present the bottom and top cover members as generally flat, attractive members.

Referring to FIG. 2, the roof members 37 actually extend downwardly and curve forwardly into a point of termination with the upper horizontal member 11b of the front wall assembly 11. Thus, as illustrated in FIG. 2, the curved structural member is actually a curved extension of the straight portion roof frame member 37. In order to support the forward or lower end 20e of each of the insulated panels 20, a series of transition members 50 extend between adjacent, parallel roof frame members 37. Each of the transition members 50, as viewed in the cross section of FIG. 2, includes a central main straight section 50a which is mounted in position by L-shaped brackets 51, which brackets are screwed into each side of the roof frame members 37 and include a perpendicular face which is attached to the central flat portion of the transition members 50a by screws. Each transition member 50 includes a lower or bottom flanged portion 50b which extends rearwardly from straight section 50a to engage the bottom of the forward end 20e of each insulated panel 20. The forward end of an insulated panel includes a right angled transversely extending recessed portion 20f which receives an L-shaped flange portion 50c and an upper, rearwardly extending flange portion 50d to mount the forward end 20e of the insulated panel in position. The flanged portions 50c and 50d are integrally formed with the straight section 50a of the transition frame member 50 and function to form a recess or groove to mount the insulated panel member 20. The upper rearwardly extending flange portion 50d also includes a forwardly extending flange portion 50e, which provides an upper flat face which is substantially flush with top metallic skin 20d. A forwardly extending flange 50f having a recess to receive a sealing strip is also formed with central section 50a. The forwardly extending flange 50f and 50e cooperate to provide a recess to receive the upper end of the curved glass panels 31.

Figure 4:
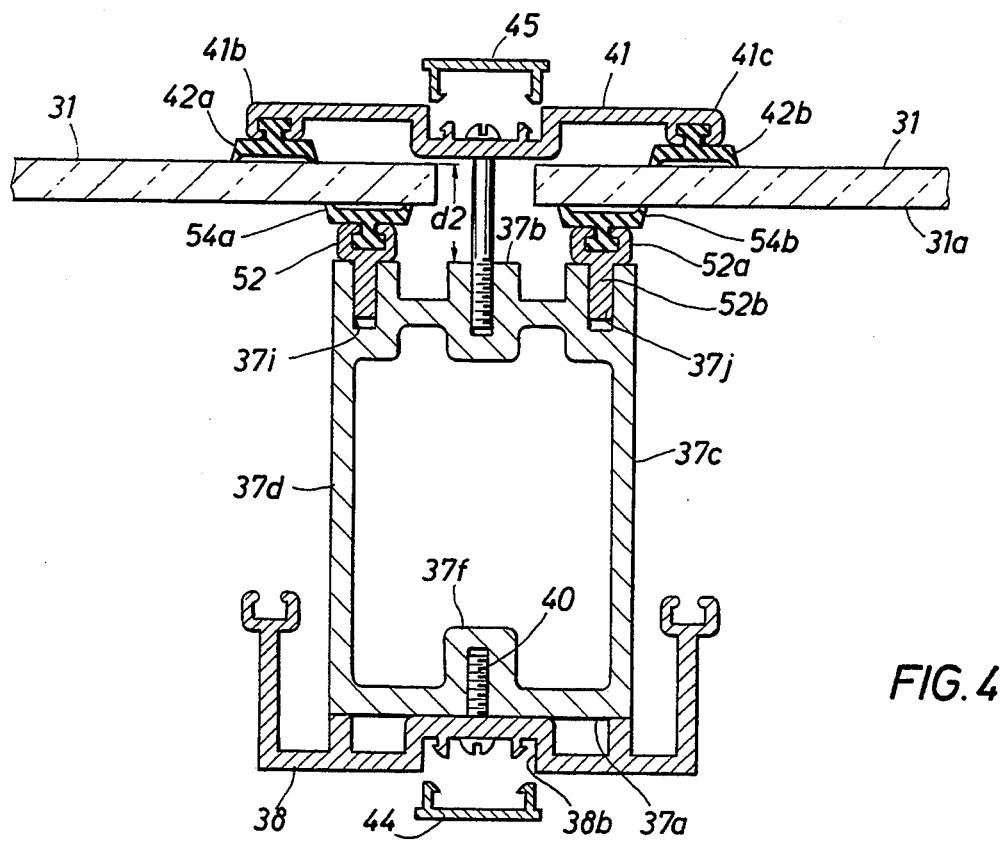
FIG. 4 is a sectional view taken along line 4—4 of FIG. 2 illustrating the support of the curved glass panels by the curved frame members in the transition section of the sun room.

Referring now to FIG. 4, details of the means for mounting glass panels 31 will be described. The roof frame member 37 for the curved transition section is, as previously discussed, a curved extension of the straight portion of the roof frame member 37 and thus these same numbers will be utilized to describe the curved portion of the roof frame member. Of course, the curved portion of roof member 37 may be a separate unit so long as such separate unit has the structural and functional features of this invention.

In addition to the curved portion of the roof frame member 37 being integrally formed with the straight roof portion, the bottom cover 38 utilized to support and sealably mount the bottom of the insulated panels 20 also extends downwardly and continuously to serve as a curved bottom cover over the inside surface 37a of the curved portion of the roof frame member. Since the bottom, curved section 38 is identical to the straight curved section 38, the same numbers and letters will be utilized. In the area of the curved section, the bottom cover member acts to cover the bottom face 37a of the roof frame member but does not serve any supporting function with the respect to the glass panels 31.

Rather, the glass panels 31 are fully supported above the upper surface 37b of the curved portion of the roof frame members 37. The top surface 37b of the roof frame members includes longitudinally extending side positioning grooves 37i and 37j, each of which receives a longitudinally extending support 52. The supports 52 in the cross section of FIG. 4 includes an upper, rectangular portion 52a integrally formed with a bottom, straight portion 52b which is inserted into the longitudinally extending grooves 37i and 37j. The upper rectangular portions 52a of the retainers 52 include a recess or groove which receives sealing strips 54a and 54b. The supports 52 in cooperation with the sealing strips 54a and 54b serve to support and sealably engage the inside surface 31a of each of the curved glass panels 31. The supports 52 and sealing strips 54a and 54b cooperate to position the top surface of the glass panels 31 a distance d2 from the upper surfaces 37b of the roof frame members 37. The distances d1 and d2 are substantially equal so that the top surface of the glass panels 31 and the top surface 20d of the insulated panels are substantially flush and form a continuum.

The outside cover 41 for the curved transition section is an extension of the cover 41 used in the straight section on the top of the insulated panels 20. Thus, the same numbers and letters will be used to describe this extension of the cover member. The outside generally rectangular bracket portions 41b and 41c mount sealing strips 42a and 42b which are the same sealing strips which engage the top metallic skins 20d of the insulated panels. In this manner, not only is the same outside cover 41 utilized but also the same upper sealing strips, which provides efficiency in installation. The same sealing strips 42a and 42b can be used all the way from the insulated panels of straight roof major portion through the curved section because the outside skin or surface of the insulated panels is substantially flush with the outside surface of the curved glass panels. The height of the rectangular portion 52a of the retainer or support members 52 is designed so that the upper surface of the glass panels 31 and the upper metallic skin 20d of the insulated panels 20 are in substantial alignment in a continuum to provide a smooth overall continuing upper surface between the insulated panels and the glass panels.

Referring again to FIG. 2, the mounting of the bottom end 31a of each curved glass panel 31 will now be described. A horizontally positioned header 60 is mounted onto the top of the standard H-bar mullions which provide the vertical supports 11d for the front wall. The horizontally positioned header 60 extends across the entire width of the sun room S and in the cross section of FIG. 2 includes a substantially flat central portion 60a. An upwardly inclined rear portion 60b is formed integrally with the central portion to mount over the terminating end of the bottom cover 38. The portion 60b is screwed into the bottom end or terminating end of the bottom cover 38 and a cap cover is mounted over the upwardly, inclined horizontal cover portion 60b.

The header 60 includes means at its forward end to mount the terminating end or lower end 31a of each glass panel 31. The central header portion 60a includes a rectangular bracket portion 60b providing a rectangular, horizontally extending recess for mounting a sealing strip member 62. The sealing strip member is positioned to engage the bottom inside surface of the glass panel such that during installation, the glass panels may be set against the sealing member 62. The central portion 60a of the header includes a bottom semicircular support section 60c having a circular recess 60d therein. The circular recess mounts for pivotal movement a pivotal support member or glazing tray 63 which is movable to the vertical position illustrated in FIG. 2 after the glass member 31 is set in position against the sealing strip 62. The pivotal closure member 63 includes a center, straight portion 63a having an internal ridge or edge 63b which extends over an upwardly extending lip element of header 60 to hold the pivotal closure member in its vertical, closed position. The central portion 63a of the pivotal closure member further includes an outwardly extending flanged end portion 63c which is fit flush against the bottom of the cap member 41 when the pivotal closure member 63 is in its vertical, closed position. In this manner, the glass panel may be fully set in place and then the closure member 63 pivoted upwardly into position to cap off and support the glass member and cover 41 in their final positions.

Having described the invention above, various modifications of the techniques, procedures, material and equipment will be apparent to those in the art. It is intended that all such variations within the scope and spirit of the appended claims be embraced thereby. For example, while FIG. 1 illustrates the sun room of this invention being attached to a house, it should be understood that the sun rooms may be attached to other structures such as commercial buildings and restaurants.

We claim:

1. An energy efficient sun room, comprising:
   a generally box-like frame assembly including a front wall frame assembly, opposing side wall frame assemblies and a roof frame assembly;
   said front wall frame assembly and said opposing side wall frame assemblies mounting generally planar glass panels, windows and/or doors in predesignated positions;
   said roof frame assembly including a plurality of insulated panels and a plurality of curved glass panels which are supported in a substantially continuous relationship;
   said roof frame assembly including spaced roof frame members extending in spaced parallel relationship supporting said plurality of insulated roof panels, each of said insulated roof panels being formed of an inner core of insulating material and having outside surfaces formed of thin metal skins;
   said roof frame assembly including a curved transition frame assembly including a plurality of curved transition frame members extending in spaced, parallel relationship between said roof frame assembly and said front wall frame assembly, one of said curved glass panels being positioned between adjacent curved transition frame members;
   said curved transition frame assembly having a roof adjoining end and roof/curved section transition means mounted with said curved transition frame members for attaching said curved glass members to said roof frame assembly and said insulated roof panel members; and
   said curved transition frame assembly further including a front wall adjoining end and a curved section/front wall transition means for supporting said front wall adjoining end and said plurality of curved glass panels on said front wall frame assembly.

2. The sun room of claim 1, wherein:
   said curved transition frame members of said curved transition frame assembly are integral with said plurality of roof frame members extending in parallel of said roof frame assembly, said integral curved transition frame members and said roof frame member extend to said front wall frame assembly.

3. The sun room of claim 1, including:

said curved transition frame assembly includes means for mounting a glass panel between adjacent curved transition frame members, each of said glass panels being curved to align with said curved transition frame members and terminate in a roof adjoining end and a bottom, end;

said curved section/front wall transition means including a top header mounted at the top of the front wall frame assembly to receive and mount said bottom ends of said curved glass panels;

said top header including a horizontally extending mounting groove to receive the bottom end of said curved glass panels; and said horizontally extending mounting groove being openable and closeable and including a pivotally mounted flange member which is pivotally attached to said top header and is movable between a released position such that said groove is open wherein said curved glass panels can be set into said groove and a closed position wherein said pivotal flange member engages and supports said bottom end of said curved glass panels in said closed groove.

4. The sun room of claim 1 wherein said roof frame assembly further includes:

two outer roof frame members and spaced, internal roof frame members which extend in a parallel relationship;

said internal spaced roof frame members extending in parallel for mounting said insulated roof frame members, each of said internal roof frame members having a top side and a bottom side;

a top cover member attached to the top side of each of said roof frame members, said top cover member including outwardly extending flange portions extending outwardly from said roof frame members, a sealing member mounted with each flange portion of said top cover member for sealably engaging the upper surfaces of said insulated roof panels positioned on each side of said roof frame members; and a bottom cover member attached to the bottom side of each of said roof frame members, said bottom cover member including outwardly extending flange portions extending outwardly from said internal roof frame members, a sealing member mounted with each flange portion of said bottom cover member for sealably engaging and supporting the bottom surfaces of said insulated panels.

5. The sun room set forth in claim 4, including:

said upper surfaces of said insulated roof panels being positioned above the upper surfaces of said internal roof frame members a predesignated distance.

6. The sun room of claim 1, wherein said roof/curved section transition means includes:

a transition support member which extends horizontally substantially between each of said roof frame members, said transition support member including first support means to support said insulated panels and second support means to support said glass panels of said transition section such that the upper surface of said glass panels and said insulated panels form a substantially continuing surface.

7. The sun room of claim 6, including:

said transition support member including a central section, said first support means being a first recessed portion to receive said insulated panel and said second support means being a second recessed portion directed in the opposite direction from said first recessed portion to receive said glass panels.

8. The sun room set forth as claim 7, including:

said second recessed portion of said transition support member having mounted therein a sealing strip to sealably engage said curved glass panel.

9. The sun room of claim 7, including:

said second recessed portion of said transition support member including a flange which extends over a portion of said curved glass panels.

10. The sun room of claim 1, including:

said curved transition frame members being generally rectangular in cross section and including an outside surface and an inside surface;

first and second mounting retainers are mounted onto said outside surface of each curved transition frame member, said first mounting retainer sealably engaging and supporting the inside surface of said one glass panel positioned on one side of said curved transition frame members and said second mounting retainer sealably engaging and supporting the inside surface of another glass panel positioned on the other side of said curved frame member; and an outside cover member attached to said outside surface of each of said curved transition frame members, said outside cover member including first and second flange portions which extend outwardly and support sealing strips which sealingly engage the outside surface of said glass panels.

11. The sun room of claim 10 including:

an inside cover member attached to the inside surface of said curved transition frame member.

12. The sun room of claim 11, including:

said spaced roof frame members being generally rectangular in cross-section and including an outside surface and an inside surface and being integrally formed with said curved transition frame members; and said outside cover member attached to said outside surface of each of said spaced roof frame members, said first and second flange portions of said outside cover member extending outwardly to support sealing strips which sealing engage the outside surface of said insulated roof panels.

13. The sun room of claim 12, including:

an inside cover attached to said inside surface of said spaced roof frame member and including first and second flange portions which mount sealing strips for sealably engaging the inside surfaces of said insulated roof panels.

14. An energy efficient sun room having a roof section of insulated panels and curved window panels, comprising:

a generally box-like frame assembly including a front vertical wall section, opposing side wall sections and a roof section of insulated panels and curved glass panels;

said roof section having a frame assembly which includes a plurality of roof frame members which extend in a parallel relationship downwardly in a straight, sloped section and having a lower, curved transition section which is supported on said front vertical wall section;

a plurality of insulated roof panels, each of said panels being formed of an inner core of insulating material and having outside surfaces formed of thin metal skins;

said roof section including roof support means for mounting said insulated roof panels between adjacently positioned roof frame members in said straight, sloped portions;

a plurality of curved glass panels;

glass panel mount means attached to said lower, curved transition sections of said roof frame members for mounting said glass panels between adjacent roof frame members such that said glass panels and said insulated panels form a substantially continuous roof for said sun room.

15. The sun room of claim 14, including:

each of said insulated panels having an upper end and a lower end and each of said curved glass panels having an upper end and a lower end;

said glass panel mounting means including a transition mounting means attached to said roof frame members for engaging said lower end of said insulated panels and said upper end of said glass panels to provide a substantially continuous roof section for said sun room.

16. An energy efficient sun room, comprising:

a generally box-like frame assembly including a front vertical wall section, opposing side wall sections and a roof section of insulated panels and curved glass panels which is supported on said front vertical wall section and opposing side wall sections;

said roof section including a plurality of insulated panels and a plurality of curved glass panels; and said roof section including a straight, sloping portion and a curved transition portion which engages said front wall section, and means mounting said plurality of insulated panels in engagement with said straight sloping portion of said roof section and means mounting said plurality of curved glass panels with said curved transition portion such that said insulating panels and said curved glass panels form a substantially continuous roof line.

* * * * *